US012111656B2

(12) United States Patent
Feng et al.

(10) Patent No.: US 12,111,656 B2
(45) Date of Patent: Oct. 8, 2024

(54) METHOD FOR REMOTE CONTROL OF AUTONOMOUS DRIVING VEHICLE, AUTONOMOUS DRIVING VEHICLE AND CLOUD DEVICE

(71) Applicant: BEIJING BAIDU NETCOM SCIENCE TECHNOLOGY CO., LTD., Beijing (CN)

(72) Inventors: Jingchao Feng, Beijing (CN); Qingrui Sun, Beijing (CN); Pengjie Zheng, Beijing (CN); Tianxiang Cui, Beijing (CN); Liming Xia, Beijing (CN); Zhuo Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 227 days.

(21) Appl. No.: 17/645,350

(22) Filed: Dec. 21, 2021

(65) Prior Publication Data
US 2022/0113722 A1  Apr. 14, 2022

(30) Foreign Application Priority Data

Dec. 22, 2020  (CN) .......................... 202011534514.7

(51) Int. Cl.
*G05D 1/00* (2024.01)
*G06F 3/0488* (2022.01)
(52) U.S. Cl.
CPC .......... *G05D 1/0044* (2013.01); *G05D 1/0214* (2013.01); *G05D 1/0238* (2013.01); *G06F 3/0488* (2013.01)

(58) Field of Classification Search
CPC .. G05D 1/0044; G05D 1/0214; G05D 1/0238; G05D 2201/0213; G05D 1/0027;
(Continued)

(56) References Cited

U.S. PATENT DOCUMENTS

2017/0192423 A1* 7/2017 Rust ..................... G05D 1/0212
2019/0084571 A1  3/2019 Zhu et al.
2020/0310417 A1* 10/2020 Pedersen .............. G05D 1/0214

FOREIGN PATENT DOCUMENTS

CN  104890670 A  9/2015
CN  104933293 A  9/2015
(Continued)

OTHER PUBLICATIONS

Office Action issued in Chinese Application No. 202011534514.7, mailed on Sep. 30, 2021 (32 pages).
(Continued)

*Primary Examiner* — Jess Whittington
*Assistant Examiner* — Brian E Yang
(74) *Attorney, Agent, or Firm* — Osha Bergman Watanabe & Burton LLP

(57) ABSTRACT

A method for remote control of an autonomous driving vehicle (ADV) includes: sending an assistance request to a cloud server in response to detecting that a current road section in front of the ADV is unable to be passed; obtaining a reference detour route returned from the cloud server; generating control instructions based on the reference detour route and a current driving environment of the ADV; and controlling the ADV based on the control instructions.

7 Claims, 4 Drawing Sheets

(58) Field of Classification Search
CPC ............ G06F 3/0488; G08G 1/096725; G08G 1/096811; G08G 1/096775; B60W 60/001; B60W 30/10; B60W 30/181; B60W 40/02; B60W 40/10; B60W 40/105; B60W 50/14; B60W 2050/0005; B60W 2050/0064; B60W 2050/146; B60W 2520/04; B60W 2520/10; G05G 7/10

See application file for complete search history.

(56) References Cited

FOREIGN PATENT DOCUMENTS

| | | | |
|---|---|---|---|
| CN | 107784850 | A | 3/2018 |
| CN | 108694844 | A | 10/2018 |
| CN | 110968092 | A | 4/2020 |
| CN | 111564051 | A | 8/2020 |
| JP | 2016162229 | A | 9/2016 |
| JP | 2020519975 | A | 7/2020 |
| JP | 2020131897 | A | 8/2020 |
| JP | 2020177292 | A | 10/2020 |
| WO | 2019010128 | A1 | 1/2019 |
| WO | 2019165135 | A1 | 8/2019 |

OTHER PUBLICATIONS

Extended European Search Report issued in corresponding EP Application No. 21216703.5 dated May 12, 2022 (12 pages).
Office Action issued in Japanese Application No. 2021-208348, mailed on Jan. 24, 2023 (11 pages).

\* cited by examiner

METHOD FOR REMOTE CONTROL OF AUTONOMOUS DRIVING VEHICLE, AUTONOMOUS DRIVING VEHICLE AND CLOUD DEVICE

TECHNICAL FIELD

The disclosure relates to the field of computer technology, in particular to the technical field of artificial intelligence such as autonomous driving and intelligent transportation, and more particular to a method for remote control of an autonomous driving vehicle, an autonomous driving vehicle and a cloud device.

BACKGROUND

With the vigorous development of computer technology, the field of artificial intelligence has also been rapidly developed, and technologies such as intelligent transportation, smart cars, and intelligent driving have also been used more and more widely. Autonomous driving is an indispensable part of intelligent transportation, smart cars, intelligent driving and other fields. It is very important how to quickly and accurately realize the remote control of autonomous driving.

SUMMARY

According to an aspect of the disclosure, a method for remote control of an autonomous driving vehicle (ADV) includes: sending an assistance request to a cloud server in response to detecting that a current road section in front of the ADV is unable to be passed; obtaining a reference detour route returned from the cloud server; generating control instructions based on the reference detour route and a current driving environment of the ADV; and controlling the ADV based on the control instructions.

According to another aspect of the disclosure, a method for remote control of an autonomous driving vehicle (ADV) includes: determining target driving data in response to obtaining an assistance request sent by the ADV, where the assistance request includes an identifier of the vehicle, and the target driving data is vehicle state data and driving environment data associated with the identifier of the ADV; determining a reference detour route for the ADV based on the target driving data; and returning the reference detour route to the ADV.

According to another aspect of the disclosure, a vehicle-side electronic device includes at least one processor and a memory communicatively connected with the at least one processor. The memory is stored with instructions executable by the at least one processor. When the instructions are executed by the at least one processor, the at least one processor is configured to send an assistance request to a cloud server in response to detecting that a current road section in front of an autonomous driving vehicle (ADV) is unable to be passed; obtain a reference detour route returned from the cloud server; generate control instructions based on the reference detour route and a current driving environment of the ADV; and control the ADV based on the control instructions.

It may be understood that the content described in this section is not intended to identify key or important features of the embodiments of the disclosure, nor is intended to limit the scope of the disclosure. Additional features of the disclosure will become easily understood based on the following description.

BRIEF DESCRIPTION OF THE DRAWINGS

The drawings herein are used to better understand the solution and do not constitute a limitation to the disclosure.

DETAILED DESCRIPTION

Figure 1A:
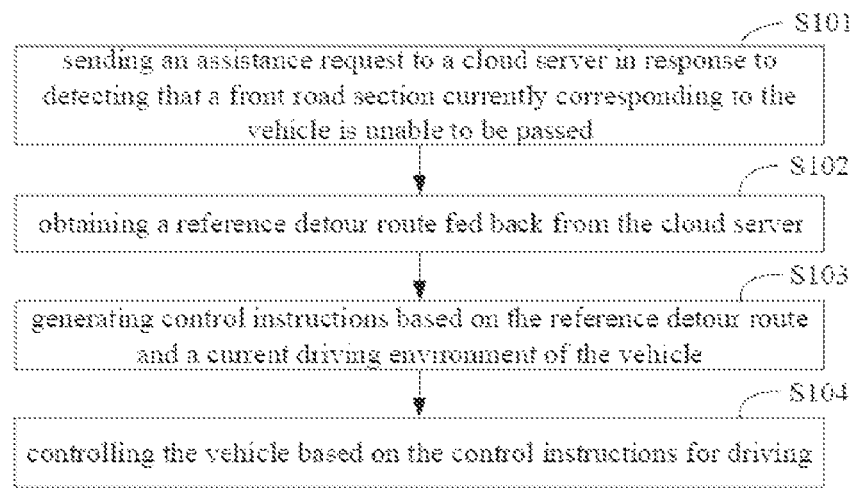
FIG. 1A is a flow chart of a method for remote control of an autonomous driving vehicle according to an embodiment of the disclosure.

Example embodiments of the disclosure are described below with reference to the accompanying drawings, which include various details of the embodiments of the disclosure to facilitate understanding, and should be considered as merely exemplary. Therefore, those skilled in the art should recognize that various changes and modifications may be made to the embodiments described herein without departing from the scope and spirit of the disclosure. For clarity and conciseness, descriptions of well-known functions and structures are omitted in the following description.

The artificial intelligence (AI) is a subject that causes a computer to simulate certain thinking processes and intelligent behaviors (such as learning, reasoning, thinking, planning, etc.) of human beings, which covers both hardware-level technologies and software-level technologies. The AI hardware technologies generally include technologies such as sensors, dedicated artificial intelligence chips, cloud computing, distributed storage, and big data processing. The AI software technologies a computer vision technology, a voice recognition technology, a natural language processing technology, and several aspects such as learning/deep learning, big data processing technology, a knowledge graph technology, etc.

The autonomous driving refers to an auxiliary driving system that can assist the driver to steer and keep driving on the road and realize a series of operations such as car following, braking, and changing lanes. The driver can control the vehicle at any time, and the system will remind the driver to intervene in the control under certain circumstances.

The intelligent transportation is an integrated transportation management system that is established by effectively integrating advanced information technologies, data communication transmission technologies, electronic sensing technologies, control technologies and computer technologies into the entire ground transportation management system, and consists of two parts (i.e., a traffic information service system and a traffic management system). This system is real-time, accurate and efficient and plays a role in a large range and in various aspects.

It should be noted that, a method for remote control of an autonomous driving vehicle according to the embodiments of the disclosure is suitable to any vehicle that may implement parallel driving. The parallel driving vehicle in the disclosure refers to any vehicle that may be manually driven, automatically driven, and may be controlled by a parallel driving platform through a network connection.

In addition, the parallel driving platform in the embodiment of the disclosure may include a cloud server and at least one driving cabin. The cloud server and the driving cabin may be connected to the vehicle through the network as needed and perform data interaction with the vehicle. In addition, the driving cabin may also be equipped with vehicle control simulation components such as a steering wheel, a throttle pedal, a brake pedal, etc., and other components that may control parallel driving vehicles according to needs, so that the driver at the driving cabin side may perform remote control of the parallel driving vehicles as needed.

It should be noted that, the terms "cloud server" and "driving cockpit" in the disclosure are merely exemplary and cannot be used as a limitation to the scope of protection of the disclosure. In actual usages, the cloud server can also be referred to as a parallel driving server, a parallel driving console, etc., and the driving cabin may also be referred to as a smart cabin, a smart cockpit, a cloud server driving cabin, a cloud server cockpit, etc., which are not limited in the disclosure.

A method for remote control of an autonomous driving vehicle, an autonomous driving vehicle and a cloud device according to the embodiments of the disclosure are described below in detail with reference to the accompanying drawings.

FIG. 1A is a flow chart of a method for remote control of an autonomous driving vehicle according to an embodiment of the disclosure.

The method for remote control of an autonomous driving vehicle according to an embodiment of the disclosure may be executed by an apparatus for remote control of an autonomous driving vehicle according to an embodiment of the disclosure. The apparatus may be configured in a vehicle.

As illustrated in FIG. 1, the method for remote control of an autonomous driving vehicle includes the following steps.

At S101, an assistance request is sent to a cloud server in response to detecting that a front road section currently corresponding to the vehicle is unable to be passed.

The vehicle may encounter emergency situations such as roadblock interception, temporary road changes, traffic controls, etc. during the automatic driving process. The vehicle may not be able to pass normally, or the vehicle may not be able to respond in time and cause an accident. In the embodiment of the disclosure, when the autonomous vehicle detects that the current road section cannot be passed during the driving process, it may send the assistance request to the cloud server.

It may be understood that, in order to further ensure the safety of the vehicle and passengers, the vehicle may be parked or the driving speed may be reduced before the assistance request is sent to the cloud server, thereby reducing safety risks.

At S102, it is obtained that a reference detour route returned from the cloud server.

The reference detour route is a route generated by the cloud server based on collected operating environment data of the vehicle after receiving the assistance request sent by the vehicle.

In addition, the reference detour route obtained by the vehicle may be in various forms. For example, the reference detour route may be coordinates of a target point, or coordinates of a batch of sequential target points. That is, after the cloud server obtains the assistance request sent by the vehicle, it does not need to send/issue specific control instructions to the vehicle, but only provides driving routes for the vehicle.

It should be noted that, the above form is only exemplary, and cannot be used as a limitation on the form of the reference detour route in the embodiment of the disclosure.

At S103, control instructions are generated based on the reference detour route and a current driving environment of the vehicle.

The current driving environment is determined by the vehicle based on the data collected by various sensors and cameras mounted on the vehicle. For example, the current driving environment may include distances between the vehicle and obstacles in various directions, road widths, weather, etc. which is not limited in the disclosure.

In actual usages, when the reference detour route is the coordinates of the target point, a route from the current position to the target point may be calculated by the vehicle according to the current driving environment, and the corresponding control instructions are generated according to the route. Alternatively, the reference detour route is the coordinates of a batch of target points, a route is first constructed by the vehicle according to the batch of target points after receiving the coordinates of the batch of target points, and then the corresponding control instructions are generated in combination with the current driving environment and the route. Alternatively, the reference detour route is the coordinates of a batch of target points, a route between two adjacent target points is constructed by the vehicle in turn according to the coordinates of the batch of target points and the sequence of target points after receiving the coordinates of the batch of target points, and then the corresponding control instructions are generated.

Figure 1B:
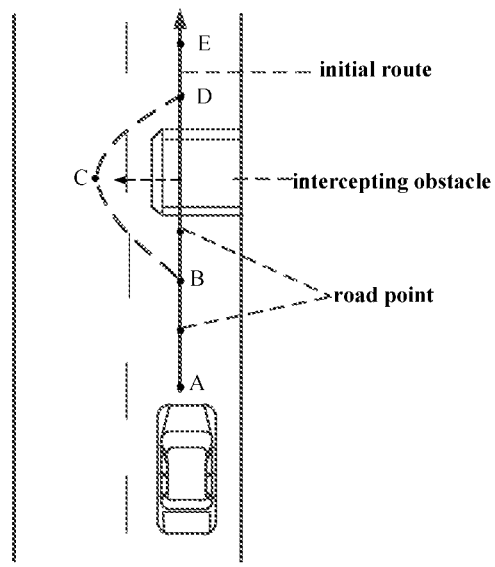
FIG. 1B is a schematic diagram of a reference detour route according to an embodiment of the disclosure.

For example, the reference detour route shown in FIG. 1B includes target points A, B, C, D, and E, the vehicle first constructs a reference detour route as shown in FIG. 1B according to the position of each target point. Then, in combination with the current driving environment, the reference detour route is analyzed, and the corresponding control instructions are generated. For example, the vehicle first determines a driving route from the current position to the target point A, and generates corresponding control instructions according to the driving route. The control instructions may include the vehicle maintains the current speed or the vehicle drives in a reduced speed.

Alternatively, when the vehicle reaches the target point B, the vehicle determines a driving route to the target point C based on the current position and data collected by various sensors and cameras mounted on the vehicle, and generates corresponding control instructions according to the driving route. The control instructions may include the vehicle drives when the steering wheel is in 45 degrees to the left, or the vehicle goes straight and drives to the left.

It should be noted that the above examples are only exemplary and cannot be used as limitations on the control instructions in the disclosure.

At S104, the vehicle is controlled based on the control instructions for driving.

It may be understood that, in order to further improve the safety of vehicle driving and reduce the risk of accidents, the obstacle detection may be continued during the process of controlling the vehicle based on the control instructions for driving. If the vehicle detects an obstacle, which indicates that the current reference detour route may have a potential safety hazard, the autonomous driving vehicle may be parked/stopped and another assistance request may be sent to the cloud server.

It may be understood that, in the embodiment of the disclosure, after the vehicle encounters a situation where a road section in front cannot be passed and sends an assistance request to the cloud server, the cloud server only sends a reference detour route to the vehicle; the corresponding control instructions are generated according to the reference detour route and the current driving environment of the vehicle. As a result, not only vehicle standstill may be avoided during the autonomous driving, but also it may ensure that the vehicle control instructions are generated by the vehicle according to the latest driving environment. That is, the control instructions for controlling the vehicle driving is safe and reliable.

In the embodiment of the disclosure, in response to detecting that the front road section currently corresponding to the vehicle is unable to be passed, an assistance request is sent to the cloud server; a reference detour route returned from the cloud server is obtained; control instructions are generated according to the reference detour route and the current driving environment of the vehicle; the vehicle is controlled to drive based on the control instructions. The cloud server only provides the reference detour routes, and the vehicle generates specific control instructions based on the reference detour route and the current driving environment, so that the control instructions are more in line with the actual driving environment of the vehicle, with high safety and reliability.

Figure 2:
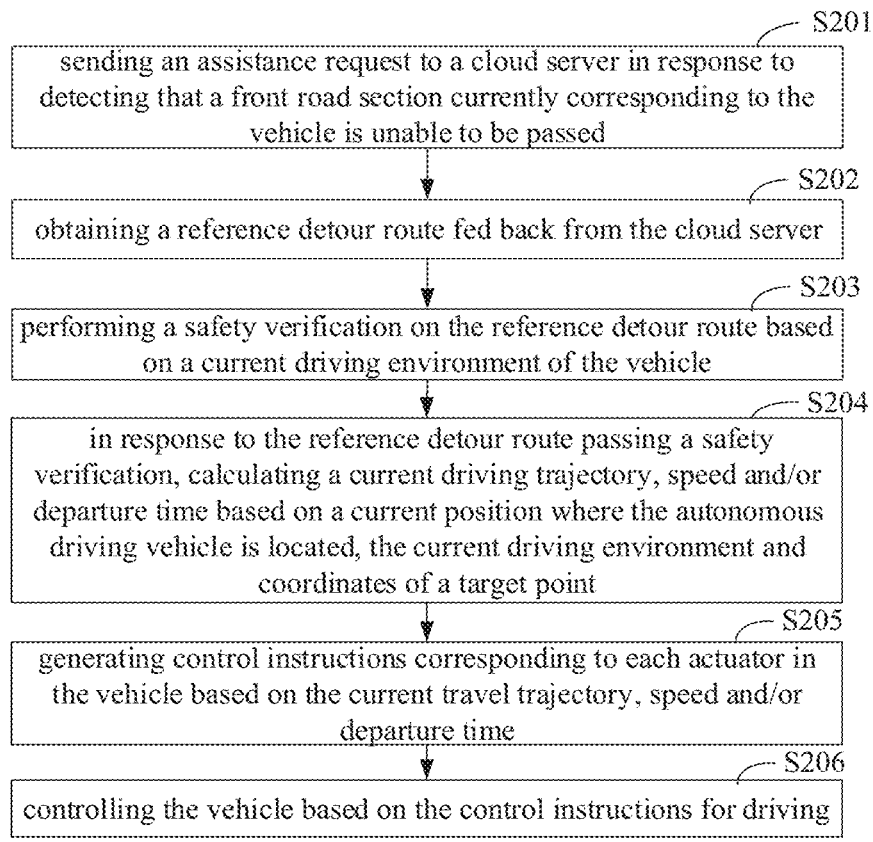
FIG. 2 is a flow chart of a method for remote control of an autonomous driving vehicle according to another embodiment of the disclosure.

It should be noted that, since the reference detour route is determined by the cloud server based on the known driving environment of the vehicle, the driving environment of the vehicle may have changed when the reference detour route is obtained and there may be situations where accurate control instructions cannot be obtained when the vehicle is enabled to generate control instructions according to the reference detour route and the current driving environment of the vehicle. Therefore, in a possible implementation of the disclosure, after the vehicle obtains the reference detour route returned from the cloud server, a safety verification may be first performed on the reference detour route and it may be determined whether to generate control instructions based on the safety verification result. With reference to FIG. 2, another method for remote control of an autonomous driving vehicle according to an embodiment of the disclosure will be further described below.

FIG. 2 is a flow chart of a method for remote control of an autonomous driving vehicle according to another embodiment of the disclosure.

At S201, an assistance request is sent to a cloud server in response to detecting that a front road section currently corresponding to the vehicle is unable to be passed.

At 202, it is obtained that a reference detour route returned from the cloud server.

At 203, a safety verification is performed on the reference detour route based on the current driving environment of the vehicle.

It may be understood that, the driving environment through which the cloud server generates the reference detour route may not completely match the actual driving environment of the vehicle. Therefore, before the control instructions are generated based on the reference detour routes, the vehicle must perform a safety verification on the detour routes, so as to generate corresponding control instructions according to the corresponding verification result.

The verification may be performed from many aspects in verifying the safety of reference detour routes.

For example, according to the data collected by various sensors and cameras on the vehicle, it can be judged from the current position to the target point that, whether there may be other vehicles behind the vehicle suddenly overtaking, whether there may be other vehicles coming from the opposite of the vehicle, whether there may be pedestrians suddenly breaking in. That is, it is verified whether there may be safety hazards in the process of driving the vehicle from the current position to the target point.

Alternatively, the vehicle may obtain a distance between the vehicle and the obstacle based on the data collected by each sensor and camera, and then verify whether it will be too close to the obstacle (leading to safety problems) in driving along the reference detour route.

Alternatively, it may be verified whether the current vehicle is safe for driving along the reference route according to the detected width of the vehicle away from the road surface.

It should be noted that, the above verification is only exemplary, and cannot be used as a limitation to performing a safety verification on the reference detour route in the embodiment of the disclosure.

At 204, in response to the reference detour route passing the safety verification, a current driving trajectory, speed and/or departure time are calculated based on a current position where the autonomous driving vehicle is located, the current driving environment and the coordinates of the target point.

If the reference detour route passes the safety verification, it indicates that the vehicle can drive along the reference detour route.

In order to further ensure the reliability of the generated control instructions and reduce the risk of accidents, during the specific driving process, the vehicle may first calculate the corresponding driving trajectory, driving speed and/or departure time based on the current position where the autonomous driving vehicle is located, the current driving environment and the coordinates of the target point.

For example, in the reference detour route shown in FIG. 1B, there are target points A, B, C, D, and E. If the vehicle wants to drive from the current position to the target point A, the vehicle first calculates the driving trajectory, speed and departure time from the current position to the target point A based on the current position, driving environment and the coordinates of the point A.

It should be noted that, the above example is only exemplary, and cannot be used as a limitation for calculating the corresponding driving trajectory, driving speed, and/or departure time in the embodiments of the present disclosure.

At 205, control instructions corresponding to each actuator in the vehicle are generated based on the current travel trajectory, speed and/or departure time.

The corresponding control instructions are generated by the vehicle based on the different conditions of current travel trajectory, speed and/or departure time.

For example, in the reference detour route shown in FIG. 1B, the driving trajectory, speed and departure time from the current position to the target point A have been calculated, so that the corresponding control instructions can be generated. The control instructions may include keeping the steering wheel at the current angle, driving at the current speed, and departing in 2 seconds.

Alternatively, in the reference detour route shown in FIG. 1B, the driving trajectory, speed and departure time from the target point A to the target point B have been calculated, so that the corresponding control instructions can be generated. The control instructions may include rotating the steering wheel of the vehicle by 45 degrees to the left, driving at the current speed, and departing in 1 second.

It should be noted that, the above examples are only exemplary and cannot be used as limitations to the control instructions in the disclosure.

It may be understood that, the generated control instructions may not include a speed, at this time, it can be assumed that the vehicle is driving at a specified speed in this scene and the specified speed is lower than the current driving speed of the autonomous driving vehicle. Alternatively, the specified speed can be set as a fixed value at which the vehicle may drive when it is under remote control.

In addition, in the actual driving process, an error message on the target point can be returned to the cloud server so that the target point is updated by the cloud server, in response to the current driving trajectory, speed, and/or departure time being abnormal.

The error message may include evidences that conflict with the target point, such as the collected images, or the operating parameters of the vehicle in the actuator.

For example, when the current driving trajectory calculated by the vehicle is not feasible from the actual driving situation and the collected images, the target point error and the collected images can be returned to the cloud server, so that the cloud server updates the target point.

Alternatively, when the current driving speed calculated by the vehicle is obviously too high, the target point error and the operating parameters of the vehicle can be returned to the cloud server, so that the cloud server can update the target point.

It should be noted that, the above situation is only exemplary and cannot be used as a limitation to the abnormal situations in the embodiment of the disclosure.

At 206, the vehicle is controlled based on the control instructions for driving.

In this embodiment, after obtaining the reference detour route returned by the cloud server, the vehicle first performs a safety verification on the reference detour route. In response to the reference detour route passing the safety verification, the current driving trajectory, speed and/or departure time are calculated based on the current position where the autonomous driving vehicle is located, the current driving environment and the coordinates of the target point, the corresponding control instructions are generated according to the calculation result, and the control instructions are used to control the driving of the vehicle. By first verifying the safety of the reference detour route, not only the safety of the reference detour route can be further ensured, but also the accuracy and feasibility of the generated control instructions can be further improved. Furthermore, it can avoid the vehicle wasting resources and time to calculate driving parameters when the reference detour route is abnormal.

The above embodiments have described the method for remote control at the vehicle side during the automatic driving process. The following describes in detail the method for remote control of the vehicle at a cloud server side during the automatic driving process with reference to FIG. 3.

Figure 3:
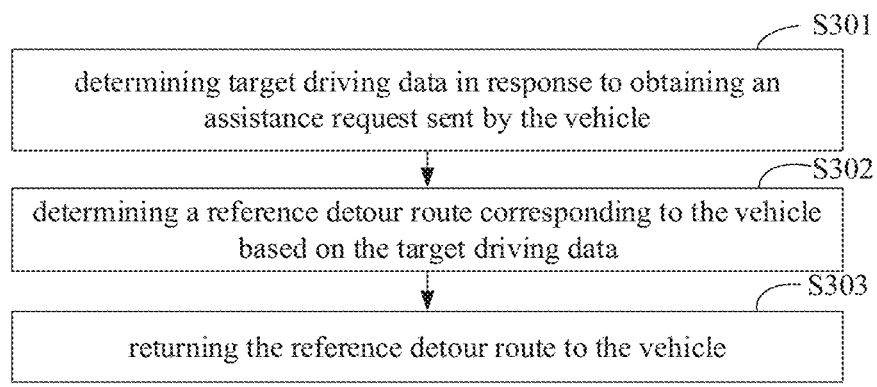
FIG. 3 is a flow chart of a method for remote control of an autonomous driving vehicle according to yet another embodiment of the disclosure.

FIG. 3 is a flow chart of a method for remote control of an autonomous driving vehicle according to an embodiment of the disclosure.

The method for remote control of an autonomous driving vehicle in the embodiment of the disclosure may be executed by an apparatus for remote control of an autonomous driving vehicle in the embodiment of the disclosure. The apparatus may be configured in a cloud server.

At 301, target driving data is determined in response to obtaining an assistance request sent by the vehicle.

The assistance request includes an identifier of the vehicle.

The target driving data is vehicle status data and driving environment data associated with the identifier of the vehicle.

It may be understood that, the data uploaded by the vehicle to the cloud server may include a current position of the vehicle, pictures collected by an on-board camera, and current operating states of various on-board devices, such as speeds, steering angles, etc.

After the cloud server receives the vehicle identifier sent by the vehicle, it can determine the vehicle that sent the assistance request, so as to determine the target driving data based on the data uploaded by the vehicle to the cloud server.

At 302, a reference detour route corresponding to the vehicle is determined based on the target driving data.

It may be understood that, in order to improve the accuracy of the reference detour route, the cloud server can first construct a reference map corresponding to the current driving environment of the vehicle on a display screen based on the target driving data.

The reference map corresponding to the driving environment may include a current position of the vehicle, distances between the vehicle and an obstacle in various directions, other surrounding vehicles and pedestrians, a road surface, etc., which are not limited in the present disclosure.

In addition, there are multiple ways to determine the reference detour route.

In an embodiment, the driver in the driving cockpit may select each reference point on the screen according to the reference map of the driving environment, and the background system may determine each reference point selected by the driver as each target point on the reference detour route after acquiring touch operations and connect target points in turn to generate a reference detour route.

In another embodiment, the background system of the cloud server may automatically select the corresponding target points in the reference map of the driving environment based on the target driving data and generate the corresponding reference detour route.

Alternatively, the background system of the cloud server automatically selects the corresponding reference points in the reference map of the driving environment based on the target driving data, and the driver verifies these reference points. Then, the points passing the verification are determined as target points for the reference detour route and the corresponding reference detour route is generated.

For example, in the reference detour route map shown in FIG. 1B, the driver in the driving cockpit selects points A, B, C, D, and E as reference points on the screen according to the reference map of the driving environment. The background system obtains these touch operations, determines the points A, B, C, D, and E as the target points on the reference detour route, and connects the target points A, B, C, D, E in sequence, so as to generate the corresponding reference detour route.

It should be noted that, the above method is only exemplary and cannot be used as a limitation to determining the reference detour route in the embodiment of the disclosure.

At 303, the reference detour route is returned to the vehicle.

After determining the reference detour route, the cloud server can return the reference detour route to the vehicle.

It may be understood that the reference detour route may be in many forms.

In an embodiment, the cloud server may send coordinates of respective points in sequence to the vehicle according to the position sequence of respective points in the reference detour route.

Alternatively, the cloud server may send coordinates of respective points in a batch to the vehicle according to the position sequence of respective points in the reference detour route.

It should be noted that, the above example is only exemplary, and cannot be used as a limitation to the form of the cloud server sending the reference detour route to the vehicle in the embodiment of the disclosure.

In the embodiment of the disclosure, after obtaining the assistance request of the vehicle, the cloud server first determines the target driving data, determines the reference detour route corresponding to the vehicle according to the target driving data, and returns the reference detour route to the vehicle. The vehicle generates corresponding control instructions according to the reference detour route returned by the cloud server and the current driving environment, and the vehicle is controlled for driving. The cloud server only provides the reference detour route, and the vehicle generates specific control instructions based on the reference detour route and the current driving environment, so that the control instructions are more in line with the actual driving environment of the vehicle, with high safety and reliability.

The disclosure also provides an apparatus for remote control of an autonomous driving vehicle.

Figure 4:
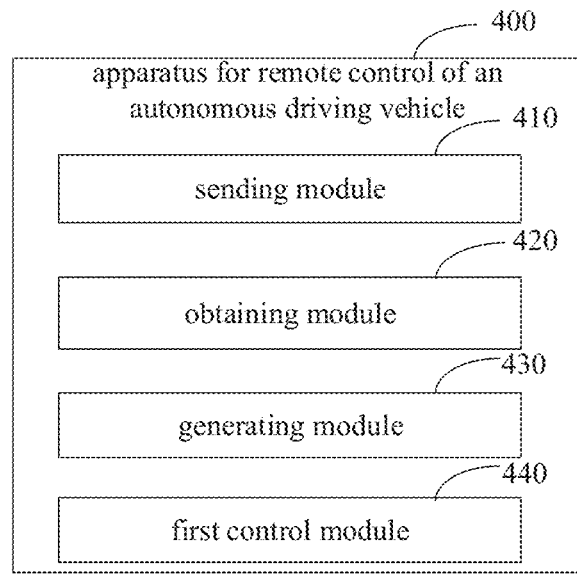
FIG. 4 is a structural schematic diagram of an apparatus for remote control of an autonomous driving vehicle according to an embodiment of the disclosure.

FIG. 4 is a structural schematic diagram of an apparatus for remote control of an autonomous driving vehicle according to an embodiment of the disclosure.

As illustrated in FIG. 4, the apparatus 400 for remote control of an autonomous driving vehicle includes a sending module 410, an obtaining module 420, a generating module 430 and a first control module 440.

The sending module 410 is configured to send an assistance request to a cloud server in response to detecting that a front road section currently corresponding to the vehicle is unable to be passed. The obtaining module 420 is configured to obtain a reference detour route returned from the cloud server. The generating module 430 is configured to generate control instructions based on the reference detour route and a current driving environment of the vehicle. The first control module 440 is configured to control the vehicle based on the control instructions for driving.

It should be noted that, the above explanations on the method for remote control of an autonomous driving vehicle in the embodiments are also applicable to apparatus for remote control of an autonomous driving vehicle in the embodiments of the disclosure. The implementation principle is similar and will not be repeated here.

With the apparatus for remote control of an autonomous driving vehicle in the embodiment of the disclosure, in response to detecting that the front road section currently corresponding to the vehicle is unable to be passed, an assistance request is sent to the cloud server; a reference detour route returned from the cloud server is obtained; control instructions are generated according to the reference detour route and the current driving environment of the vehicle; the vehicle is controlled for driving based on the control instructions. The cloud server only provides the reference detour route, and the vehicle generates specific control instructions based on the reference detour route and the current driving environment, so that the control instructions are more in line with the actual driving environment of the vehicle, with high safety and reliability.

Figure 5:
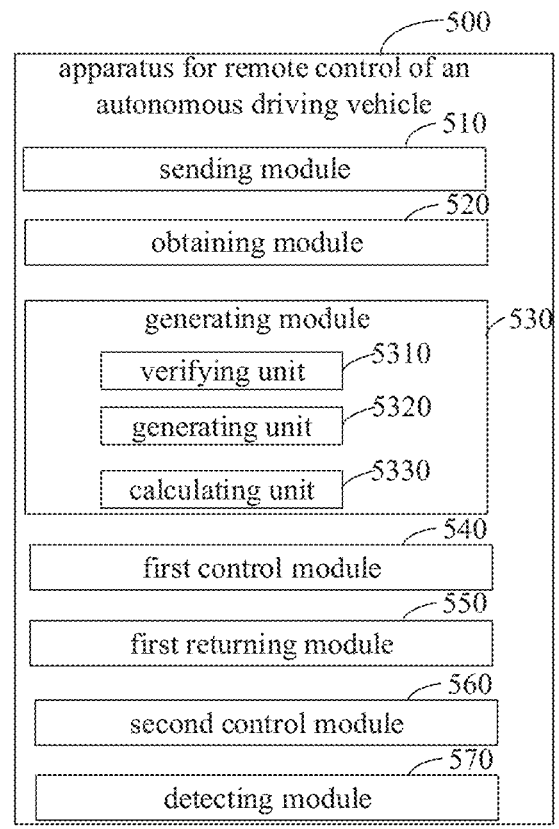
FIG. 5 is a structural schematic diagram of an apparatus for remote control of an autonomous driving vehicle according to another embodiment of the disclosure.

FIG. 5 is a structural schematic diagram of an apparatus for remote control of an autonomous driving vehicle according to another embodiment of the disclosure.

As illustrated in FIG. 5, the apparatus 500 for remote control of an autonomous driving vehicle includes a sending module 510, an obtaining module 520, a generating module 530, a first control module 540, a first returning module 550, a second control module 560 and a detecting module 570.

The sending module 510 is configured to send an assistance request to a cloud server in response to detecting that a front road section currently corresponding to the vehicle is unable to be passed.

It may be understood that, the sending module 510 in the embodiment may have same functions and structures as the sending module 410 in the above embodiment.

The obtaining module 520 is configured to obtain a reference detour route returned from the cloud server.

It may be understood that, the obtaining module 520 in the embodiment may have same functions and structures as the sending module 420 in the above embodiment.

The generating module 530 includes a verifying unit 5310, configured to perform a safety verification on the reference detour route based on the current driving environment of the vehicle; a generating unit 5320, configured to generate control instructions corresponding to the reference detour route in response to the reference detour route passing the safety verification and also configured to generate control instructions corresponding to each actuator in the vehicle based on the current travel trajectory, speed and/or departure time; and a calculating unit 5330, configured to calculate a current driving trajectory, speed and/or departure time based on a current position where the autonomous driving vehicle is located, the current driving environment and the coordinates of the target point.

It may be understood that, the generating module 530 in the embodiment may have same functions and structures as the generating module 430 in the above embodiment.

The first control module 540 is configured to control the vehicle based on the control instructions for driving.

It may be understood that, the first control module 540 in the embodiment may have same functions and structures as the first control module 440 in the above embodiment.

The first returning module 540 is configured to return a target point error message to the cloud server so that the target point is updated by the cloud server, in response to the current driving trajectory, speed, and/or departure time being abnormal.

The second control module 560 is configured to control the vehicle to park or reducing a driving speed of the vehicle.

The detecting module 570 is configured to perform obstacle detection when the vehicle is controlled for driving based on the control instructions and also configured to control the autonomous driving vehicle to park and send another assistance request to the cloud server in response to detecting an obstacle.

It should be noted that, the above explanations on the method for remote control of an autonomous driving vehicle in the embodiments are also applicable to apparatus for remote control of an autonomous driving vehicle in the embodiments of the disclosure. The implementation principle is similar and will not be repeated here.

With the apparatus for remote control of an autonomous driving vehicle in the embodiment of the disclosure, after obtaining the reference detour route returned by the cloud server, the vehicle first performs a safety verification on the reference detour route; in response to the reference detour route passing the safety verification, the current driving trajectory, speed and/or departure time are calculated based on the current position where the autonomous driving vehicle is located, the current driving environment and the coordinates of the target point; the corresponding control instructions are generated according to the calculation result, and the control instructions are used to control the driving of the vehicle. By first verifying the safety of the reference detour route, not only the safety of the reference detour route can be further ensured, but also the accuracy and feasibility of the generated control instructions can be further improved. Furthermore, it can avoid the vehicle wasting resources and time to calculate driving parameters when the reference detour route is abnormal.

Figure 6:
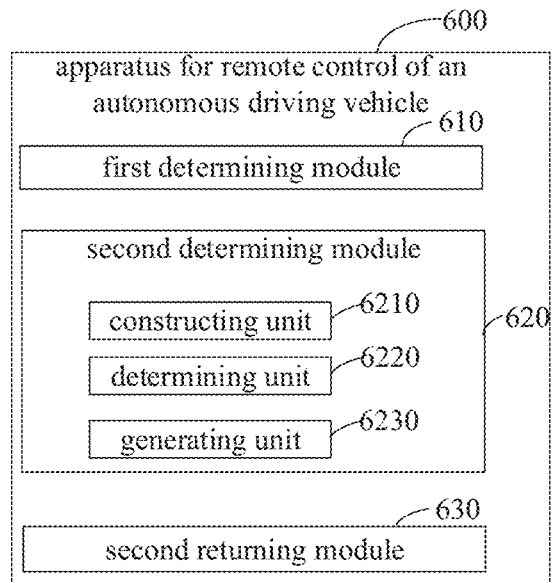
FIG. 6 is a structural schematic diagram of an apparatus for remote control of an autonomous driving vehicle according to yet another embodiment of the disclosure.

FIG. 6 is a structural schematic diagram of an apparatus for remote control of an autonomous driving vehicle according to yet another embodiment of the disclosure.

As illustrated in FIG. 6, the apparatus 600 for remote control of an autonomous driving vehicle includes a first determining module 610, a second determining module 620 and a second returning module 630.

The first returning module 610 is configured to determine target driving data in response to obtaining an assistance request sent by the vehicle, where the assistance request includes an identifier of the vehicle, and the target driving data is vehicle state data and driving environment data associated with the identifier of the vehicle.

The second determining module 620 is configured to determine a reference detour route corresponding to the vehicle based on the target driving data.

In a possible implementation, the second determining module 620 also includes a constructing unit 6210, configured to construct a reference map corresponding to the current driving environment of the vehicle on a display screen based on the target driving data; a determining unit 6220, configured to determine respective target points in the reference detour route in response to obtaining a touch operation on the display screen; and a generating unit 6230, configured to generate the reference detour route by connecting the respective target points in sequence.

The second returning 630 is configured to return the reference detour route to the vehicle.

It should be noted that, the above explanations on the method for remote control of an autonomous driving vehicle in the embodiments are also applicable to apparatus for remote control of an autonomous driving vehicle in the embodiments of the disclosure. The implementation principle is similar and will not be repeated here.

With the apparatus for remote control of an autonomous driving vehicle in the embodiment of the disclosure, after obtaining the assistance request of the vehicle, the cloud server first determines the target driving data, determines the reference detour route corresponding to the vehicle according to the target driving data, and returns the reference detour route to the vehicle; the vehicle generates corresponding control instructions according to the reference detour route returned by the cloud server and the current driving environment, and the vehicle is controlled for driving. The cloud server only provides the reference detour route, and the vehicle generates specific control instructions based on the reference detour route and the current driving environment, so that the control instructions are more in line with the actual driving environment of the vehicle, with high safety and reliability.

According to the embodiments of the disclosure, an electronic device and a readable storage medium are provided.

It may be understood that, the electronic device may be a vehicle-side electronic device or a cloud electronic device.

Figure 7:
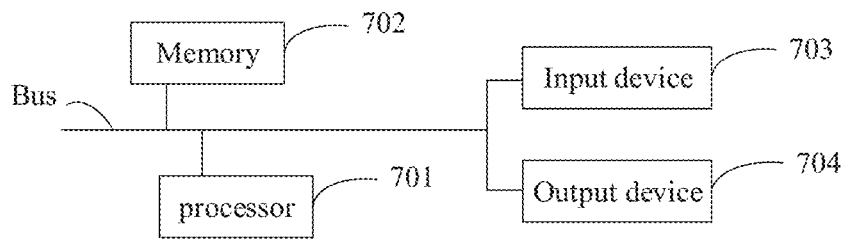
FIG. 7 is a block diagram of a vehicle-side electronic device configured to implement the method for remote control of an autonomous driving vehicle according to an embodiment of the disclosure.

As illustrated in FIG. 7, it is a block diagram of a vehicle-side electronic device configured to implement the method for remote control of an autonomous driving vehicle according to an embodiment of the disclosure. Electronic devices are intended to represent various forms of digital computers, such as laptop computers, desktop computers, workstations, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the vehicle-side electronic device includes one or more processors 701, a memory 702, and interfaces for connecting various components, including a high-speed interface and a low-speed interface. The various components are interconnected using different buses and may be mounted on a common motherboard or otherwise installed as required. The processor may process instructions executed in the electronic device, including instructions stored in or on the memory to display graphical information of the GUI on an external input/output device (such as a display device) coupled to an interface. In other embodiments, if necessary, a plurality of processors and/or buses may be used with a plurality of memories and processors. Similarly, a plurality of electronic devices may be connected, each providing some of the necessary operations (for example, as a server array, a group of blade servers, or a multiprocessor system). In FIG. 7, a processor 701 is taken as an example.

The memory 702 is a non-transitory computer-readable storage medium according to the disclosure. The memory stores instructions executable by at least one processor, so that the at least one processor executes the method for remote control of an autonomous driving vehicle according to the disclosure. The non-transitory computer-readable storage medium of the disclosure stores computer instructions, and the computer instructions are used to cause a computer execute the method for remote control of an autonomous driving vehicle according to the disclosure.

As a non-transitory computer-readable storage medium, the memory 702 may be configured to store non-transitory software programs, non-transitory computer executable programs and modules, such as program instructions/modules (for example, the sending module 410, the obtaining module 420, the generating module 430 and the first control module 440 as illustrated in FIG. 4) corresponding to the method for remote control of an autonomous driving vehicle in the embodiments of the disclosure. The processor 701 executes various functional applications and data processing of the server by running non-transitory software programs, instructions, and modules stored in the memory 702, that is, implementing the method for remote control of an autonomous driving vehicle in the above method embodiment.

The memory 702 may include a storage program area and a storage data area. The storage program area may store an operating system and an application program required for at least one function. The storage data area may store data created according to the use of the positioning electronic device. In addition, the memory 702 may include a high-speed random access memory and a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the positioning electronic device through a network. Examples of the above networks include, but are not limited to, the Internet, corporate intranets, local area networks, mobile communication networks, and combinations thereof.

The vehicle-side electronic device implementing the method for remote control of an autonomous driving vehicle may also include: an input device 703 and an output device 704. The processor 701, the memory 702, the input device 703, and the output device 704 may be connected through a bus or in other manners. In FIG. 7, the connection through the bus is taken as an example.

The input device 703 may receive input numeric or character information, and generate key signal input related to user settings and function control of the electronic device configured to implement the method for remote control of an autonomous driving vehicle, such as a touch screen, a keypad, a mouse, a trackpad, a touchpad, a pointing stick, one or more mouse buttons, trackballs, joysticks and other input devices. The output device 704 may include a display device, an auxiliary lighting device (for example, LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Figure 8:
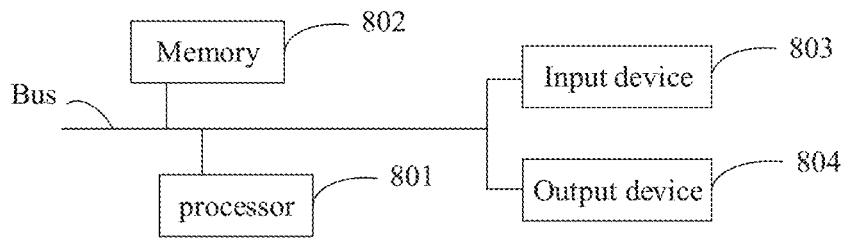
FIG. 8 is a block diagram of a cloud electronic device configured to implement the method for remote control of an autonomous driving vehicle according to an embodiment of the disclosure.

FIG. 8 is a block diagram of a cloud electronic device configured to implement the method for remote control of an autonomous driving vehicle according to an embodiment of the disclosure.

As illustrated in FIG. 8, the cloud electronic device includes one or more processors 801, a memory 802, and interfaces for connecting various components, including a high-speed interface and a low-speed interface. The various components are interconnected using different buses and may be mounted on a common motherboard or otherwise installed as required. The processor may process instructions executed in the electronic device, including instructions stored in or on the memory to display graphical information of the GUI on an external input/output device (such as a display device) coupled to an interface. In other embodiments, if necessary, a plurality of processors and/or buses may be used with a plurality of memories and processors. Similarly, a plurality of electronic devices may be connected, each providing some of the necessary operations (for example, as a server array, a group of blade servers, or a multiprocessor system). In FIG. 8, a processor 801 is taken as an example.

The cloud electronic device may also include an input device 803 and an output device 804.

It should be noted that, the memory 802, the input device 803 and the output device 804 may have same structures and functions as the memory 702, the input device 703 and the output device 704 in the vehicle-side electronic device, respectively, which are not repeated here.

The disclosure also provides an autonomous driving vehicle that may include the vehicle-side electronic device in the above embodiment, or other relevant devices able to perform operations on the vehicle, which are not limited in the disclosure.

In particular, the cloud electronic device may be the cloud server in the above embodiment.

Furthermore, the cloud device may also include the driving cabin in the above embodiment.

Various implementations of the systems and techniques described herein may be implemented in digital electronic circuit systems, integrated circuit systems, application specific ASICs (application specific integrated circuits), computer hardware, firmware, software, and/or combinations thereof. These various embodiments may being implemented in one or more computer programs, which may be executed and/or interpreted on a programmable system including at least one programmable processor. The programmable processor may be a dedicated or general-purpose programmable processor that may receive data and instructions from a storage system, at least one input device, and at least one output device, and transmit the data and instructions to the storage system, the at least one input device, and the at least one output device.

These computing programs (also referred to as programs, software, software applications, or codes) include machine instructions for programmable processors, and may be implemented using high-level procedures and/or object-oriented programming languages, and/or assembly/machine language. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs)), including machine-readable media that receive machine instructions as machine-readable signals. The term "machine-readable signal" refers to any signal used to provide machine instructions and/or data to a programmable processor.

In order to provide interaction with the user, the systems and techniques described herein may be implemented on a computer having a display device (e.g., a Cathode Ray Tube (CRT) or a Liquid Crystal Display (LCD) monitor) for displaying information to the user; and a keyboard and a pointing device (such as a mouse or a trackball) through which the user can provide inputs to the computer. Other types of devices may also be used to provide interactions with the user. For example, the feedback provided to the user may be any form of sensory feedback (for example, visual feedback, auditory feedback, or haptic feedback). And the inputs from the user may be received in any form (including acoustic input, voice input, or haptic input).

The systems and techniques described herein may be implemented in a computing system that includes back-end components (for example, as a data server), or a computing system that includes middleware components (for example, an application server), or a computing system that includes front-end components (for example, a user computer with a graphical user interface or a web browser through which the user may interact with the implementation of the systems and techniques described herein), or a computing system that includes any combination of such back-end components, middleware components or front-end components. The components of the system may be connected to each other through any form or medium of digital data communication (for example, a communication network). Examples of communication networks include: a local area network (LAN), a wide area network (WAN), and the Internet.

The computer system can include a client and a server. The client and server are generally far away from each other and interact through a communication network. The relationship between the client and the server is generated by computer programs running on the respective computers and having a client-server relationship with each other. The server may be a cloud server, also known as a cloud computing server or a cloud host, which is a host product in the cloud computing service system to solve defects in the conventional physical host and virtual private server (VPS) services, such as difficulty in management and weak business scalability. The server may also be a server of a distributed system, or a server combined with a blockchain.

According to the technical solution of the embodiment of the disclosure, in response to detecting that the front road section currently corresponding to the vehicle is unable to be passed, an assistance request is sent to the cloud server; a reference detour route returned from the cloud server is obtained; control instructions are generated according to the reference detour route and the current driving environment of the vehicle; the vehicle is controlled for driving based on the control instructions. The cloud server only provides the reference detour route, and the vehicle generates specific control instructions based on the reference detour route and the current driving environment, so that the control instructions are more in line with the actual driving environment of the vehicle, with high safety and reliability.

The embodiment of the disclosure also provides a computer program product including computer programs. When the computer programs are executed by a processor, the method for remote control of an autonomous driving vehicle is executed as in the above-mentioned aspect of the embodiment.

It may be understood that the various forms of processes illustrated above may be used to reorder, add or delete steps. For example, the steps described in the disclosure may be executed in parallel, sequentially, or in a different order, as long as the desired result of the technical solution disclosed in the invention may be achieved, which is not limited herein.

The above specific implementations do not constitute a limitation to the protection scope of the disclosure. Those skilled in the art should understand that various modifications, combinations, sub-combinations and substitutions may be made according to design requirements and other factors. Any modification, equivalent replacement and improvement made within the spirit and principle of the disclosure shall be included in the protection scope of the disclosure.

What is claimed is:

1. A method for remote control of an autonomous driving vehicle (ADV), comprising:
sending an assistance request to a cloud server in response to detecting that a current road section in front of the ADV is unable to be passed;
obtaining a reference detour route returned from the cloud server, wherein the reference detour route comprises coordinates of a batch of target points;
performing a safety verification on the reference detour route based on the current driving environment of the ADV, to determine whether there are safety hazards from a current position where the ADV is located to an adjacent target point of the current position, wherein the safety hazards comprise a previously undetected overtaking vehicle behind the ADV, a vehicle traveling in an opposite direction of travel as the ADV, and a previously undetected breaking in pedestrian;
in response to determining that there are no safety hazards, calculating a current driving trajectory, speed and departure time based on the current position, the current driving environment and the coordinates of the adjacent target point;
generating control instructions corresponding to respective actuators in the ADV based on the current driving trajectory, speed and departure time; and
controlling the ADV based on the control instructions,
wherein the method further comprises: in response to the current driving trajectory, speed, and departure time being not feasible for the ADV to drive from the current position to the adjacent target point, returning an error message corresponding to the adjacent target point to the cloud server, so that the adjacent target point is updated by the cloud server.

2. The method of claim 1, further comprising:
performing obstacle detection when the ADV is controlled based on the control instructions; and in response to detecting an obstacle, controlling the ADV to park or reduce a driving speed of the ADV, and sending another assistance request to the cloud server.

3. A method for remote control of an autonomous driving vehicle (ADV), performed by a cloud server, the method comprising:
determining target driving data in response to obtaining an assistance request sent by the ADV, where the assistance request includes an identifier of the ADV, and the target driving data is vehicle state data and driving environment data associated with the identifier of the ADV;
determining a reference detour route for the ADV based on the target driving data; and
returning the reference detour route comprising coordinates of a batch of target points to the ADV, so that the ADV performs a safety verification on the reference detour route based on a current driving environment of the ADV to determine whether there are safety hazards from a current position where the ADV is located to an adjacent target point of the current position, wherein the safety hazards comprise a previously undetected overtaking vehicle behind the ADV, a vehicle traveling in an opposite direction of travel as the ADV, and a previously undetected breaking in pedestrian; in response to determining that there are no safety hazards; the ADV calculates a current driving trajectory, speed and departure time based on the current position, the current driving environment and the coordinates of the adjacent target point, and generates control instructions corresponding to respective actuators in the ADV based on the current driving trajectory, speed and departure time; the ADV returns an error message corresponding to the adjacent target point to the cloud server in response to the current driving trajectory, speed, and departure time being not feasible for the ADV to drive from the current position to the adjacent target point;

wherein the method further comprises: in response to receiving the error message returned by the ADV, updating the adjacent target point in the reference detour route.

4. The method of claim 3, wherein determining the reference detour route for the ADV comprises:
constructing a reference map corresponding to a current driving environment of the vehicle on a display screen based on the target driving data;
determining respective target points on the reference detour route in response to obtaining a touch operation on the display screen; and
generating the reference detour route by connecting the respective target points.

5. The method of claim 4, wherein determining respective target points on the reference detour route comprises:
obtaining a plurality of reference points through the touch operation of a driver on the reference map constructed on the display screen, or
automatically selecting a plurality of points from the reference map and determining points passing the verification of the driver as the target points of the reference detour route.

6. A vehicle-side electronic device, comprising:
at least one processor; and
a memory communicatively connected with the at least one processor;
wherein the memory is stored with instructions executable by the at least one processor, when the instructions are executed by the at least one processor, the at least one processor is configured to:
send an assistance request to a cloud server in response to detecting that a current road section in front of an autonomous driving vehicle (ADV) is unable to be passed;
obtain a reference detour route returned from the cloud server, wherein the reference detour route comprises coordinates of a batch of target points;
perform a safety verification on the reference detour route based on the current driving environment of the ADV, to determine whether there are safety hazards from a current position where the ADV is located to an adjacent target point of the current position, wherein the safety hazards comprise a previously undetected overtaking vehicle behind the ADV, a vehicle traveling in an opposite direction of travel as the ADV, and a previously undetected breaking in pedestrian;
in response to determining that there are no safety hazards, calculate a current driving trajectory, speed and departure time based on the current position, the current driving environment and the coordinates of the adjacent target point;
generate control instructions corresponding to respective actuators in the ADV based on the current driving trajectory, speed and departure time; and
control the ADV based on the control instructions,
wherein the at least one processor is further configured to:
in response to the current driving trajectory, speed, and departure time being not feasible for the ADV to drive from the current position to the adjacent target point, returning an error message corresponding to the adjacent target point to the cloud server, so that the adjacent target point is updated by the cloud server.

7. The electronic device of claim 6, wherein the at least one processor is further configured to: perform obstacle detection when the ADV is controlled based on the control instructions; in response to detecting an obstacle, control the ADV to park or reduce a driving speed of the ADV, and send another assistance request to the cloud server.

* * * * *